US007998626B2

(12) United States Patent
Visco et al.

(10) Patent No.: US 7,998,626 B2
(45) Date of Patent: *Aug. 16, 2011

(54) ACTIVE METAL FUEL CELLS

(75) Inventors: Steven J. Visco, Berkeley, CA (US);
Yevgeniy S. Nimon, Danville, CA (US);
Bruce D. Katz, Orinda, CA (US);
Lutgard C. De Jonghe, Lafayette, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,066

(22) Filed: Jul. 6, 2010

(65) Prior Publication Data

US 2010/0273067 A1    Oct. 28, 2010

Related U.S. Application Data

(63) Continuation of application No. 12/334,116, filed on Dec. 12, 2008, now Pat. No. 7,781,108, which is a continuation of application No. 10/825,587, filed on Apr. 14, 2004, now Pat. No. 7,491,458.

(60) Provisional application No. 60/529,825, filed on Dec. 15, 2003, provisional application No. 60/518,948, filed on Nov. 10, 2003.

(51) Int. Cl.
*H01M 4/02* (2006.01)
*H01M 12/04* (2006.01)
*H01M 12/06* (2006.01)
*H01M 12/08* (2006.01)

(52) U.S. Cl. ............... 429/402; 429/403; 429/404

(58) Field of Classification Search .............. 429/421, 429/447, 502, 402, 403, 404
See application file for complete search history.

(56) References Cited

U.S. PATENT DOCUMENTS

| 3,528,856 A | 9/1970 | Ovshinsky |
| 3,607,417 A | 9/1971 | McRae et al. |
| 3,615,835 A | 10/1971 | Ovshinsky |
| 3,625,769 A | 12/1971 | Lyall |
| 3,703,415 A | 11/1972 | Mitoff et al. |
| 3,912,536 A | 10/1975 | Galli et al. |
| 3,976,509 A | 8/1976 | Tsai et al. |
| 4,007,057 A | 2/1977 | Littauer et al. |
| 4,091,182 A | 5/1978 | Farrington et al. |

(Continued)

FOREIGN PATENT DOCUMENTS

EP    0111214    11/1983

(Continued)

OTHER PUBLICATIONS

International Search Report and Written Opinion dated Oct. 18, 2005 from International Application No. PCT/US2004/033372.

(Continued)

*Primary Examiner* — Gregg Cantelmo
(74) *Attorney, Agent, or Firm* — Weaver Austin Villeneuve & Sampson LLP

(57) ABSTRACT

Active metal fuel cells are provided. An active metal fuel cell has a renewable active metal (e.g., lithium) anode and a cathode structure that includes an electronically conductive component (e.g., a porous metal or alloy), an ionically conductive component (e.g., an electrolyte), and a fluid oxidant (e.g., air, water or a peroxide or other aqueous solution). The pairing of an active metal anode with a cathode oxidant in a fuel cell is enabled by an ionically conductive protective membrane on the surface of the anode facing the cathode.

20 Claims, 4 Drawing Sheets

Lithium/Air or Lithium/Water Fuel Cell

U.S. PATENT DOCUMENTS

| | | | |
|---|---|---|---|
| 4,162,202 A | 7/1979 | Dey |
| 4,163,084 A | 7/1979 | Tsai et al. |
| 4,210,707 A | 7/1980 | Farrington |
| 4,402,995 A | 9/1983 | Fleischer |
| 4,405,416 A | 9/1983 | Raistrick et al. |
| 4,414,293 A | 11/1983 | Joy et al. |
| 4,504,561 A | 3/1985 | Winsel |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | Visco et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,737,197 B2 | 5/2004 | Chu et al. |
| 6,766,817 B2 | 7/2004 | da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,829,212 B2 | 11/2010 | Visco et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0190501 A1 | 10/2003 | Rendina |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0063051 A1 | 3/2006 | Jang |
| 2006/0078790 A1 | 4/2006 | Nimon et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0172739 A1 | 7/2007 | Visco et al. |
| 2007/0231704 A1 | 10/2007 | Inda |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2008/0124468 A1 | 5/2008 | Kim |
| 2009/0286114 A1 | 11/2009 | Visco et al. |
| 2009/0297935 A1 | 12/2009 | Visco et al. |
| 2010/0104934 A1 | 4/2010 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |

| | | |
|---|---|---|
| JP | 62-243247 | 10/1987 |
| JP | 09-320645 | 12/1997 |
| WO | 98/28811 | 7/1998 |
| WO | 99/57770 | 11/1999 |
| WO | 02/50933 | 6/2002 |
| WO | 2005/038953 | 4/2005 |
| WO | 2005/038962 | 4/2005 |

OTHER PUBLICATIONS

De Jonghe et al., "Chemical Protection of a Lithium Surface", PolyPlus Battery Company, U.S. Appl. No. 11/092,781, filed Mar. 28, 2005, pp. 1-34.
U.S. Appl. No. 11/092,781, Office Action mailed Jun. 16, 2008.
U.S. Appl. No. 11/092,781, Office Action mailed Feb. 1, 2007.
U.S. Appl. No. 11/092,781, Office Action mailed Jun. 25, 2007.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 11/823,847, Office Action mailed Apr. 28, 2009.
U.S. Appl. No. 12/649,245, Office Action mailed Mar. 31, 2010.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O-Al2O3-TiO2-SiO2-P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+x}M_xTi_{2-x}(PO_4)_3$, M = Al, Sc, Y, and La) Systems", Dept. of Industrial Chemistry, pp. 590-591.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.

Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O-Al_2O_3-TiO_3-P_2O_5$", Solid State Ionics, 96 (1997), pp. 195-200.
Fu, Jie, "Fast Li+ ion conducting glass-ceramics in the system $Li_2O-Al_2O_3-GeO_2-P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3$, $M^{3+}=Al^{3+},Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "Lithium Water Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages.
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.

International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, 4$^{TH}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., *Water Durable Lithium Ion Conducting Composite Membranes from the Li$_2$O-Al$_2$O$_3$-TiO$_2$-P$_2$O$_5$ Glass-Ceramic*, Journal of Electrochemical Society, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable Li$_2$O$_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42$^{nd}$ Power Sources Conference, Jun. 2006, P2.14.
Read J., "Electrolyte Formulation and Temperature Performance of the Li/O$_2$ Battery", Proceeding of the 9$^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 11, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
CN patent application No. 200480037293.5, Office Action mailed Jun. 24, 2010.
U.S. Appl. No. 12/649,245, Office Action mailed Jul. 19, 2010.
AU patent application No. 2004306866, Notice of Acceptance mailed Jun. 17, 2010.
U.S. Appl. No. 12/475,403, Notice of Allowance mailed Oct. 7, 2010.
U.S. Appl. No. 12/475,403, Allowed Claims, Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type Li$_5$La$_3$M$_2$O$_{12}$ (M = Nb, Ta)", J. Am. Chem. Soc. 86 (3) 437-40 (2003), Oct. 21, 2002.

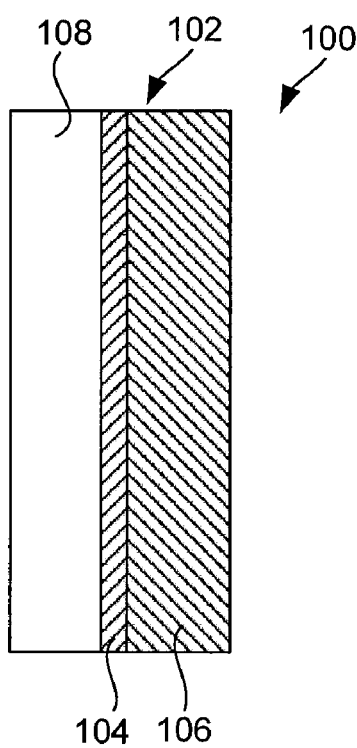
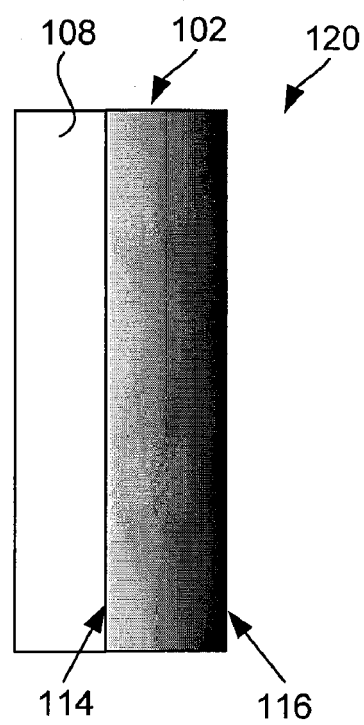
FIG. 1A  FIG. 1B

ACTIVE METAL FUEL CELLS

CROSS-REFERENCE TO RELATED APPLICATIONS

This application is a continuation of U.S. patent application Ser. No. 12/334,116 filed Dec. 12, 2008, titled ACTIVE METAL FUEL CELLS, now U.S. Pat. No. 7,781,108; which is a continuation of U.S. patent application Ser. No. 10/825,587 filed Apr. 14, 2004, titled ACTIVE METAL FUEL CELLS, now issued as U.S. Pat. No. 7,491,458; which claims priority to U.S. Provisional Patent Application No. 60/529,825 filed Dec. 15, 2003, titled ACTIVE METAL FUEL CELLS, and to U.S. Provisional Patent Application No. 60/518,948 filed Nov. 10, 2003, titled BI-FUNCTIONALLY COMPATIBLE IONICALLY CONDUCTIVE COMPOSITES FOR ISOLATION OF ACTIVE METAL ELECTRODES IN A VARIETY OF ELECTROCHEMICAL CELLS AND SYSTEMS; the disclosures of which are incorporated herein by reference in their entirety and for all purposes.

BACKGROUND OF THE INVENTION

1. Field of the Invention

The present invention relates generally to active metal electrochemical devices.

More particularly, this invention relates to active metal (e.g., lithium) fuel cells made possible by active metal electrode structures having ionically conductive membranes for protection of the active metal from deleterious reaction with air, moisture and other fuel cell components, methods for their fabrication and applications for their use.

2. Description of Related Art

In recent years, much attention has been given to hydrogen and/or fossil fuel based fuel cells. A fuel cell is an electrochemical device that continuously changes the chemical energy of a fuel (e.g., hydrogen) and an oxidant (e.g., oxygen in air or water) directly to electrical energy, without combustion. Fuel atoms give up their electrons in the process. Like a battery a fuel cell has electrodes and electrolyte. However, while a battery stores energy, a fuel cell generates it from fuel and oxidant supplied to the electrodes during operation. In a hydrogen fuel cell, oxygen is typically supplied to the oxygen electrode (cathode; electrode to which cations migrate) from ambient air, and the hydrogen fuel is supplied to the fuel electrode (anode) either from a pressurized cylinder or from a metal hydride forming alloy. Fossil fuel based fuel cell systems Fossil fuel based fuel cell systems extract the required hydrogen from hydrocarbons, such as methane or methanol.

Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium.

The low equivalent weight of alkali metals, such as lithium, render them particularly attractive as electrode materials. Lithium provides greater energy per volume than the traditional hydrogen fuel or fossil fuel cell standards. However, it has not previously been possible to leverage the advantages of lithium and other alkali or other active metals in fuel cells. Previously, there was no way to isolate the highly reactive anode alkali metal fuel from the cathode oxidant while maintaining a path for the alkali metal ions.

SUMMARY OF THE INVENTION

The present invention relates generally to active metal electrochemical devices. More particularly, this invention relates to active metal fuel cells.

The present invention provides an active metal fuel cell. The fuel cell has a renewable active metal (e.g., lithium) anode and a cathode structure that includes an electronically conductive component (e.g., a porous metal or alloy), an ionically conductive component (e.g., an electrolyte), and a fluid oxidant (e.g., air, water or a peroxide or other aqueous solution). The pairing of an active metal anode with a cathode oxidant in a fuel cell is enabled by an ionically conductive protective membrane on the surface of the anode facing the cathode.

In one aspect, the invention pertains to a fuel cell. The fuel cell includes a renewable active metal anode and a cathode structure that includes an electronically conductive component, an ionically conductive component, and a fluid oxidant. An ionically conductive protective membrane is provided on the surface of the anode facing the cathode. The membrane is composed of one or more materials configured to provide a first surface chemically compatible with the active metal of the anode in contact with the anode, and a second surface substantially impervious to and chemically compatible with the cathode structure and in contact with the cathode structure.

The active metal anode is renewable in that it is configured for replacement or supplementation of the active metal to provide a fuel supply for continuous operation of the fuel cell for as long as desired. It may be in the solid or liquid phase.

The cathode structure includes an electronically conductive component (e.g., a porous metal or alloy), an ionically conductive component (e.g., an electrolyte), and a fluid oxidant (e.g., air, water or a peroxide or other aqueous solution). Advantageously, the cathode structure may include fluid oxidants that are obtained from the fuel cell's operating environment, such as air or fresh or salt water.

Furthermore, in some embodiments, the active metal fuel cell can be coupled with a PEM $H_2/O_2$ fuel cell to capture and use the hydrogen released, and further improve the energy density and fuel efficiency of the system.

These and other features of the invention are further described and exemplified in the detailed description below.

BRIEF DESCRIPTION OF THE DRAWINGS

FIG. 1A is a schematic illustration of an active metal anode structure incorporating an ionically conductive protective laminate composite membrane in accordance with the present invention.

FIG. 1B is a schematic illustration of an active metal anode structure incorporating an ionically conductive protective graded composite membrane in accordance with the present invention.

DETAILED DESCRIPTION OF SPECIFIC EMBODIMENTS

Figure 2:
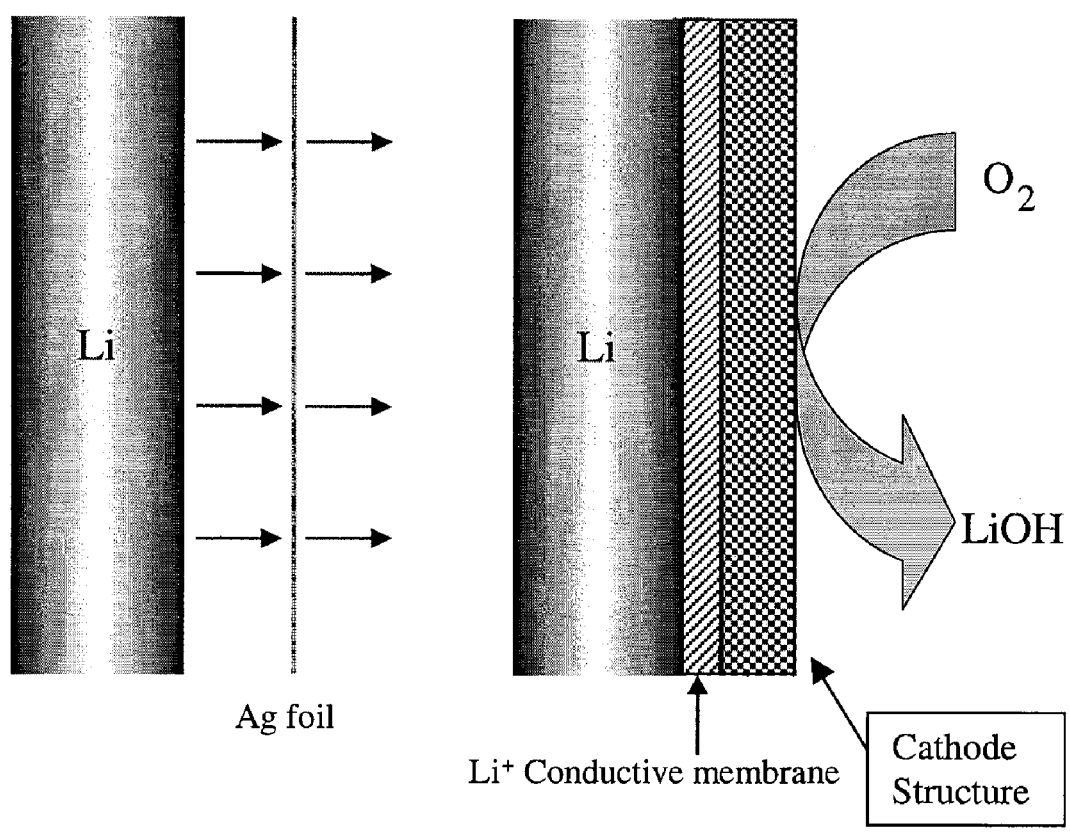
FIG. 2 illustrates a solid phase anode embodiment of an active metal fuel cell in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention provides an active metal fuel cell. The fuel cell has a renewable active metal (e.g., lithium) anode and a cathode structure that includes an electronically conductive component (e.g., a porous metal or alloy), an ionically conductive component (e.g., an electrolyte), and a fluid oxidant (e.g., air, water or a peroxide or other aqueous solution). The pairing of an active metal anode with a cathode oxidant in a fuel cell is enabled by an ionically conductive protective membrane on the surface of the anode facing the cathode. The membrane is composed of one or more materials configured to provide a first surface chemically compatible with the active metal of the anode in contact with the anode, and a second surface substantially impervious to and chemically compatible with the cathode structure and in contact with the cathode structure.

The active metal anode is renewable in that it is configured for replacement or supplementation of the active metal to provide a fuel supply for continuous operation of the fuel cell for as long as desired. For example, prior to or during operation of the fuel cell, additional lithium, for example, may be added to the anode by contacting the existing lithium of the anode with additional lithium having a bond coat such as a thin layer of Ag, Al, Sn or other suitable Li alloy-forming metal in an inert environment. The new Li/Ag alloys to the old thereby supplementing it or "replacing" it as it is depleted in the fuel cell redox reaction with the cathode oxidant. Alternatively, the active metal fuel of the anode could be continuously supplied to the membrane by virtue of it being dissolved in a suitable solvent, such as, in the case of lithium, hexamethyl phosphoramide (HMPA), ammonia, organic amides, amines, or other suitable solvents.

The cathode structure includes an electronically conductive component (e.g., a porous metal or alloy), an ionically conductive component (e.g., an electrolyte), and a fluid oxidant in the gas or liquid state (e.g., air, water or a peroxide, such as hydrogen peroxide, or other aqueous solution). Like the fuel of the anode, the oxidant of the cathode may be continuously supplemented and the waste products removed by flushing fresh oxidant and optionally electrolyte through the cathode structure.

Furthermore, in some embodiments, the active metal fuel cell can be coupled with a PEM $H_2/O_2$ fuel cell to capture and use the hydrogen released, and further improve the energy density and fuel efficiency of the system.

Protective Membranes

The present invention concerns alkali (or other active) metal fuel cells and electrochemical cells incorporating them. The fuel cell fuel electrode (anode) has a highly ionically conductive (at least about $10^{-5}$ S/cm to $10^{-4}$ S/cm, and as high as $10^{-3}$ S/cm or higher) protective membrane adjacent to the alkali metal electrode that effectively isolates (de-couples) the alkali metal electrode from solvent, electrolyte processing and/or cathode environments, including such environments that are normally highly corrosive to Li or other active metals, and at the same time allows ion transport in and out of these potentially corrosive environments. The protective membrane is thus chemically compatible with active metal (e.g., lithium) on one side and a wide array of materials, including those including those that are normally highly corrosive to Li or corrosive to Li or other active metals on the other side, while at the same time allowing ion transport from one side to the other. In this way, a great degree of flexibility is permitted the other components of an electrochemical device, such as a fuel cell, made with the protected active metal electrodes. Isolation of the anode from other components of a fuel cell or other electrochemical cell in this way allows the use of virtually any solvent, electrolyte and/or cathode material in conjunction with the anode. Also, optimization of electrolytes or cathode-side solvent systems may be done without impacting anode stability or performance.

In a specific embodiment, the protective membrane is composed of at least two components of different materials having different chemical compatibility requirements. By "chemical compatibility" (or "chemically compatible") it is meant that the referenced material does not react to form a product that is deleterious to fuel cell operation when contacted with one or more other referenced fuel cell components or manufacturing, handling or storage conditions.

A first material component of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first component material). Such a reactive material is sometimes referred to as a "precursor" material.

A second material component of the composite is substantially impervious, ionically conductive and chemically compatible with the first material component and the environment of the cathode paired with the anode. In the case of a fuel cell, the cathode environment is a cathode structure that includes an electronically conductive component (e.g., a porous metal or alloy), an ionically conductive component (e.g., an electrolyte), and a fluid oxidant (e.g., air, water or a peroxide or other aqueous solution). By substantially impervious it is meant that the material provides a sufficient barrier to aqueous electrolytes and solvents and other fuel cell component materials that would be materials that would be damaging to the active metal anode material to prevent any such damage that would degrade anode performance from occurring. Thus, it should be non-swellable and free of pores, defects, and any pathways allowing air, moisture, electrolyte, etc. to penetrate though it to the first material. Additional components are possible to achieve these aims, or otherwise enhance electrode stability or performance. All components of the composite have high ionic conductivity, at least $10^{-7}$S/cm, generally at least $10^{-6}$S/cm, for example at least $10^{-5}$S/cm to $10^{-4}$S/cm, and as high as $10^{-3}$S/cm or higher so that the overall ionic conductivity of the multi-component protective structure is at least $10^{-5}$S/cm and as high as $10^{-3}$S/cm or higher.

A protective composite in accordance with the present invention may be a laminate of two (or more) layers having different chemical compatibility. A wide variety of materials may be used in fabricating protective composites in accordance with the present invention, consistent with the principles described above. For example, a first layer of a composite laminate, in contact with the active metal, may be composed, in whole or in part, of active metal nitrides, active metal phosphides, active metal halides or active metal phosphorus oxynitride-based glass. Specific examples include $Li_3N$, $Li_3P$, LiI, LiBr, LiCl, LiF and LiPON. These materials may be preformed and contacted with the active metal electrode, or they may be formed in situ by contacting the active metal (e.g., lithium) with precursors such as metal nitrides, metal phosphides, metal halides, red phosphorus, iodine, nitrogen or phosphorus containing organics and polymers, and the like. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

A second layer of the protective composite may be composed of a material that is substantially impervious, ionically conductive and chemically compatible with the first material or precursor and the cathode structure, such as glassy or amorphous metal ion conductors, ceramic active metal ion conductors, and glass-ceramic active metal ion conductors. Such suitable materials are substantially gap-free, non-swellable and are inherently ionically conductive. That is, they do not depend on the presence of a liquid electrolyte or other agent for their ionically conductive properties. Glassy or amorphous Glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted, may be used. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0--50% |
| $TiO_2$ | 0--50% |
| $ZrO_2$ | 0-10% |
| $M_2O_3$ | 0 < 10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$ and where M is an element selected from the group consisting of Nd, Sm, Eu, Gd, Tb, Dy, Ho, Er, Tm and Yb and/or and $Li_{1+x+y}Q_xTi_{2-x}Si_yP_{3-y}O_{12}$ where $0 \leq X \leq 0.4$ and $0 \leq Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Either layer may also include additional components. For instance, a suitable active metal compatible layer (first layer) may include a polymer component to enhance its properties. For example, polymer-iodine complexes like poly(2-vinylpyridine)-iodine ($P2VP-I_2$), polyethylene-iodine, or tetraalkylammonium-iodine complexes can react with Li to form a LiI-based film having significantly higher ionic conductivity than that for pure LiI. Also, a suitable first layer may include a material used to facilitate its use, for example, the residue of a wetting layer (e.g., Ag) used to prevent reaction between vapor phase lithium (during deposition) and LiPON when LiPON is used as a first layer material.

In addition, the layers may be formed using a variety of techniques. These include deposition or evaporation (including e-beam evaporation) or thermal spray techniques such as plasma spray of layers of material, such as $Li_3N$ or an ionically conductive glass (e.g., LiPON). Also, as noted above, the active metal electrode adjacent layer may be formed in situ from the non-deleterious reaction of one or more precursors with the active metal electrode. For example, a $Li_3N$ layer may be formed on a Li anode by contacting $CuN_3$ with the Li anode surface, or $Li_3P$ may be formed on a Li anode by contacting red phosphorus with the Li anode surface.

Such compositions, components and methods for their fabrication are described in U.S. Provisional Patent Application No. 60/418,899, filed Oct. 15, 2002, titled IONICALLY CONDUCTIVE COMPOSITES FOR PROTECTION OF ANODES AND ELECTROLYTES, its corresponding U.S. patent application Ser. No. 10/686,189, filed Oct. 14, 2003, and titled IONICALLY CONDUCTIVE COMPOSITES FOR PROTECTION OF ACTIVE METAL ANODES, WHICH IS NOW U.S. Pat. No. 7,282,296, ISSUED ON Oct. 16, 2007; US Oct. 16, 2007; U.S. patent application Ser. No. 10/731,771, filed Dec. 5, 2003, and titled IONICALLY CONDUCTIVE COMPOSITES FOR PROTECTION OF ACTIVE METAL ANODES, WHICH IS NOW U.S. Pat. No. 7,282, 302, ISSUED ON Oct. 16, 2007; and U.S. patent application Ser. No. 10/772,228, filed Feb. 3, 2004, and titled IONICALLY CONDUCTIVE MEMBRANES FOR PROTECTION OF ACTIVE METAL ANODES AND BATTERY CELLS, WHICH IS NOW U.S. Pat. No. 7,390,591, ISSUED ON Jun. 24, 2008. These applications are incorporated by reference herein in their entirety for all purposes.

FIG. 1A illustrates an anode structure incorporating a protective composite membrane in accordance with one embodiment of the present invention. The structure 100 includes an active metal electrode 108, e.g., lithium, bonded with a protective composite laminate 102. The protective composite laminate 102 is composed of a first layer 104 of a material that is both ionically conductive and chemically compatible with an active metal electrode material. The first layer, in contact with the active metal, may be composed, in whole or in part, of active metal nitrides, active metal phosphides, active metal halides or active metal phosphorus oxynitride-based glasses. Specific examples include $Li_3N$, $Li_3P$, LiI, LiBr, LiCl and LiF. In at least one instance, LiPON, the first material is chemically compatible with oxidizing materials. The thickness of the first material layer is preferably about 0.1 to 5 microns, or 0.2 to 1 micron, for example about 0.25 micron. Another possibility would be the use of $Li_5La_3M_2O_{12}$ which is claimed to be stable to molten lithium and have an ionic conductivity of about $10^{-6}$ S/cm$^1$.

These first layer materials may be contacted with the active metal, or they may be formed in situ by contacting lithium (or other active metal) with precursors such as metal nitrides, metal phosphides, metal halides, red phosphorus, iodine and the like. The in situ formation of the first layer may be by way of conversion of the precursors to a lithiated analog, for example, according to reactions of the following type (using P, $CuN_3$, and $PbI_2$ precursors as examples):

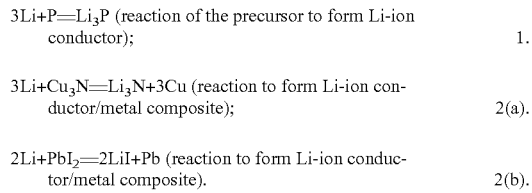

$3Li+P=Li_3P$ (reaction of the precursor to form Li-ion conductor);     1.

$3Li+Cu_3N=Li_3N+3Cu$ (reaction to form Li-ion conductor/metal composite);     2(a).

$2Li+PbI_2=2LiI+Pb$ (reaction to form Li-ion conductor/metal composite).     2(b).

First layer composites, which may include electronically conductive metal particles, formed as a result of in situ conversions meet the requirements of a first layer material for a protective composite in accordance with the present invention and are therefore within the scope of the invention.

A second layer 106 of the protective composite is composed of a substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes. Suitable glass-ceramic ion active metal ion conductors are described, for example, in U.S. Pat. Nos. 5,702,995, 6,030,909, 6,315,881 and 6,485,622, previously incorporated herein by reference and are available from OHARA Corporation, Japan.

The ionic conductivity of the composite is at least $10^{-6}$ S/cm, generally at least at least $10^{-5}$ S/cm to $10^{-4}$ S/cm, and as high as $10^{-3}$ S/cm or higher. The thickness of the second material layer is preferably about 0.1 to 1000 microns, or, where the ionic conductivity of the second material layer is between about $10^{-5}$ about $10^{-3}$ S/cm, 10 to 1000 microns, preferably between 1 and 500 micron, and more preferably between 10 and 100 microns, for example 20 microns.

The layers may be formed using a variety of techniques. These include deposition or evaporation (including e-beam evaporation) or thermal spray methods such as vacuum plasma spray of layers of material, such as $Li_3N$ or an ionically conductive glass. Also, as noted above, the active metal electrode adjacent layer may be formed in situ from the non-deleterious reaction of one or more precursors with the active metal electrode. For example, a $Li_3N$ layer may be formed on a Li anode by contacting $CuN_3$ with the Li anode surface, or $Li_3P$ may be formed on a Li anode by contacting red phosphorus with the Li anode surface.

Also, an approach may be used where a first material and second material are coated with another material such as a transient and/or wetting layer. For example, an OHARA glass ceramic plate is coated with a LiPON layer, followed by a thin silver (Ag) coating. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely reaction with the LiPON first material layer. After deposition, the solid phase lithium is stable against the LiPON. A multitude of such transient/wetting (e.g., Al, Sn or other Li alloy-forming metal) and first layer material combinations can be used to achieve the desired result.

In addition to protection of the first layer material against reaction with Li, a Li alloy-forming metal film can serve two more purposes. In some cases after formation the first layer material the vacuum needs to be broken in order to transfer this material through the ambient or dry room atmosphere to the other chamber for Li deposition. The metal film can protect the first layer against reaction with components of this atmosphere. In addition, the Li alloy-forming metal can serve as a bonding layer for reaction bonding of Li to the first layer material. When lithium is deposited onto this structure, the Ag is converted to Ag—Li and diffuses, at least in part, into the greater mass of deposited lithium.

In many implementations of the present invention, active metal electrode material (e.g., lithium) will be applied to the first layer material which is residing on the second material (the first material having been previously applied to the second material), as described further with reference to specific embodiments below.

In one example, the where LiPON is used as the first material and an OHARA-type glass-ceramic (as described herein) in used as the second material, the resistivity of LiPON is too large for it to be used in a multi-micron film, but the resistivity of the glass-ceramic is much lower. Thus, a 20-50 micron film of glass-ceramic protected from a Li electrode with about a 0.2 micron film of LiPON can be used.

In addition to the protective composite laminates described above, a protective membrane in accordance with the present invention may alternatively be a functionally graded layer, as shown in FIG. 1B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 120 stable on one side 114 to lithium or other active metal, and on the other side 116 substantially impervious and stable to the cathode/electrolyte, other battery cell components and preferably to ambient conditions. In this embodiment, the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of OHARA glass-ceramic). The transition between materials may occur over any (e.g., relatively short, long or intermediate) distance in the composite. To form a protected anode, lithium is then bonded to the graded membrane on the first component material (stable to active metal) side of the graded composite protective layer, for example as described in U.S. patent application Ser. No. 10/686,189, filed Oct. 14, 2003, and titled IONICALLY CONDUCTIVE COMPOSITES FOR PROTECTION OF ACTIVE METAL ANODES, which is now U.S. Pat. No. 7,282,296, issued on Oct. 16, 2007; U.S. patent application Ser. No. 10/731,771, filed Dec. 5, 2003, and titled IONICALLY CONDUCTIVE COMPOSITES FOR PROTECTION OF ACTIVE METAL ANODES, which is now U.S. Pat. No. 7,282,302, issued on Oct. 16, 2007; and U.S. patent application Ser. No. 10/772,228, filed and U.S. patent application Ser. No. 10/772,228, filed Feb. 3, 2004, and titled IONICALLY CONDUCTIVE MEMBRANES FOR PROTECTION OF ACTIVE METAL ANODES AND BATTERY CELLS, which is now U.S. Pat. No. 7,390,591, issued on Jun. 24, 2008, previously incorporated by reference herein.

In other embodiments, it may be possible for the protective membrane to be composed of a single material that is chemically compatible with both the active metal electrode and any solvent, electrolyte, and/or cathode environments, including such environments that are normally highly corrosive to active metals, and at the same time allows efficient ion transport from one side of the membrane to the other to the other at a high level, generally having ionic conductivity, at least $10^{-5}$S/cm to $10^{-4}$S/cm, and as high as $10^{-3}$S/cm or higher.

Fuel Cell Designs

The protected active metal electrodes described herein enable the construction of novel active metal fuel cells. As noted above, active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal fuel electrode (anode) is composed of lithium.

One example of such a fuel cell in accordance with the present invention is a lithium fuel cell, as illustrated in FIG. 2. The fuel cell includes an lithium fuel electrode (anode) in the solid state. Alternatively, another active metal, particularly an alkali metal, may be used. The lithium metal electrode can be bonded to a lithium ion conductive membrane according to any of the techniques described herein and in the applications incorporated by reference, as described above, with or without the use of a bond coat such as a thin layer of Ag, Al, Sn or other suitable Li alloy-forming metal, depending upon the technique used. The cell also includes a cathode structure having an electronically conductive component, an ionically conductive component, and a fluid oxidant.

The cathode structure's electronically conductive component is provided adjacent to the protective membrane on the anode and provides electron transport from the anode (via a cathode current collector) and facilitates electroreduction of the cathode oxidant. It may be, for example, a porous metal or alloy, such as porous nickel. The ionically conductive component is generally a fluid electrolyte, and preferably an aqueous electrolyte, for example salt water, or aqueous solutions of LiCl, LiBr, LiI, LiOH, $NH_4Cl$, $NH_4Br$, or other suitable electrolyte salts. The fluid oxidant may be air, water or a peroxide or other aqueous solution.

As noted above, in some embodiments, the electronically conductive component may be composed of porous nickel. Still further, the electronically conductive component may be treated with an ionomer, such as per-fluoro-sulfonic acid polymer film (e.g., du Pont NAFION) to expand the range of acceptable electrolytes to those having little or no native ionic conductivity. An additional advantage of ionomers like NAFION is that the salt is chemically bonded to the polymer backbone, and therefore cannot be flushed out, so if a liquid oxidant such as hydrogen peroxide were to flow through the cathode, it would not be necessary to flush the prior electrolyte salt out of the cathode to avoid having salt dissolved in the peroxide solution.

An example of a suitable cathode structure is an air electrode conventionally used in metal (e.g., Zn)/air batteries or low temperature (e.g., PEM) fuel cells.

As the fuel cell operates to generate electricity, the lithium metal of the renewable anode is consumed. The metal is then supplemented with fresh lithium metal, as required, to provide continuous operation for as long as desired. For example, prior to or during operation of the fuel cell, additional lithium may be added to the anode by contacting the existing lithium of the anode with additional lithium having a bond coat, such as a thin layer of Ag or other suitable alloying metal, in an inert environment. The Ag layer reacts with the surface of the existing Li forming Li—Ag alloy. The Li—Al alloy layer serves as a strong reaction bond between the additional Li and the existing lithium. The new Li/Ag alloys to the old thereby supplementing it or "replacing" it as it is depleted in the fuel cell redox reaction with the cathode oxidant. In this way, the renewable lithium anode can be replaced or supplemented through the use of a thin bonding foil such as Ag, Al, or Sn foil, as shown in the figure, as it is depleted.

Like the fuel of the anode, the oxidant of the cathode may be continuously supplemented and the waste products removed by flushing fresh oxidant and optionally electrolyte through the cathode structure. The cathode oxidant can thus be continuously supplied with oxygen from either air or water or from a liquid oxidant such as peroxide. The cell then operates as a fuel cell where the $Li^+$ conductive membrane and electronically conductive component of the cathode structure are static, and the Li anode material is continuously replaced as it is depleted, as is the cathode oxidant (e.g., air, water or peroxide) on the other side of the protective membrane.

Figure 3:
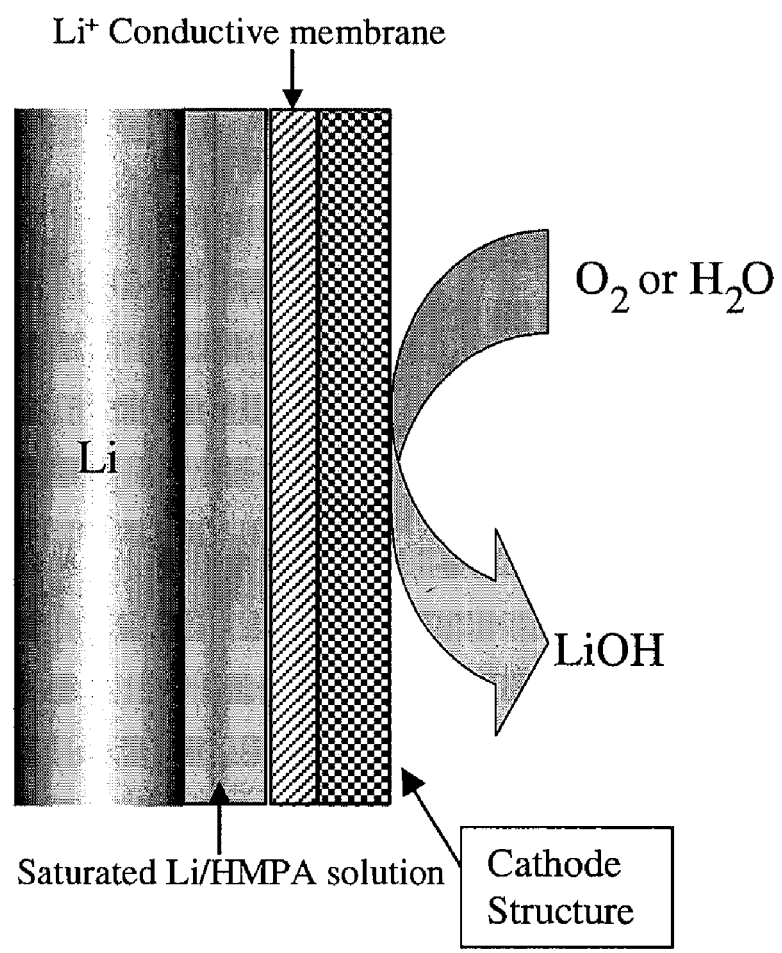
FIG. 3 illustrates a liquid phase anode embodiment of an active metal fuel cell in accordance with the present invention.

In another embodiment, depicted in FIG. 3, the lithium (or other active metal) anode could be continuously supplied to the membrane by virtue of it being dissolved in a suitable solvent. For lithium, suitable solvents include hexamethyl phosphoramide (HMPA), liquid ammonia, organic amides, amines, in particular methylamine, and mixtures thereof, and other suitable solvents. Lithium is known to dissolve in HMPA in high concentration to form stable solutions of solvated electrons. In this way, bulk lithium metal can be fed into a constant volume of HMPA, keeping the Li/HMPA solution near or at the solubility limit. As lithium is transported across the protective membrane more lithium metal will dissolve into the HMPA solution, and the cell acts as a true Li/air or Li/water fuel cell. Thus, in this embodiment, lithium metal is continuously supplied to the Li/HMPA solution anode, while air or water (cathode oxidant) is supplied to the cathode structure. The energy density of such a device will be very high since the weight of the passive components are negligible relative to the fuel and air supply.

In a fuel cell, any part of the active metal electrode that is not covered by the protective membrane will generally be sealed off from the corrosive environments, such as by a current collector material (e.g., copper), an o-ring seal, a crimp seal, polymer or epoxy sealant, or combination of these.

Figure 4:
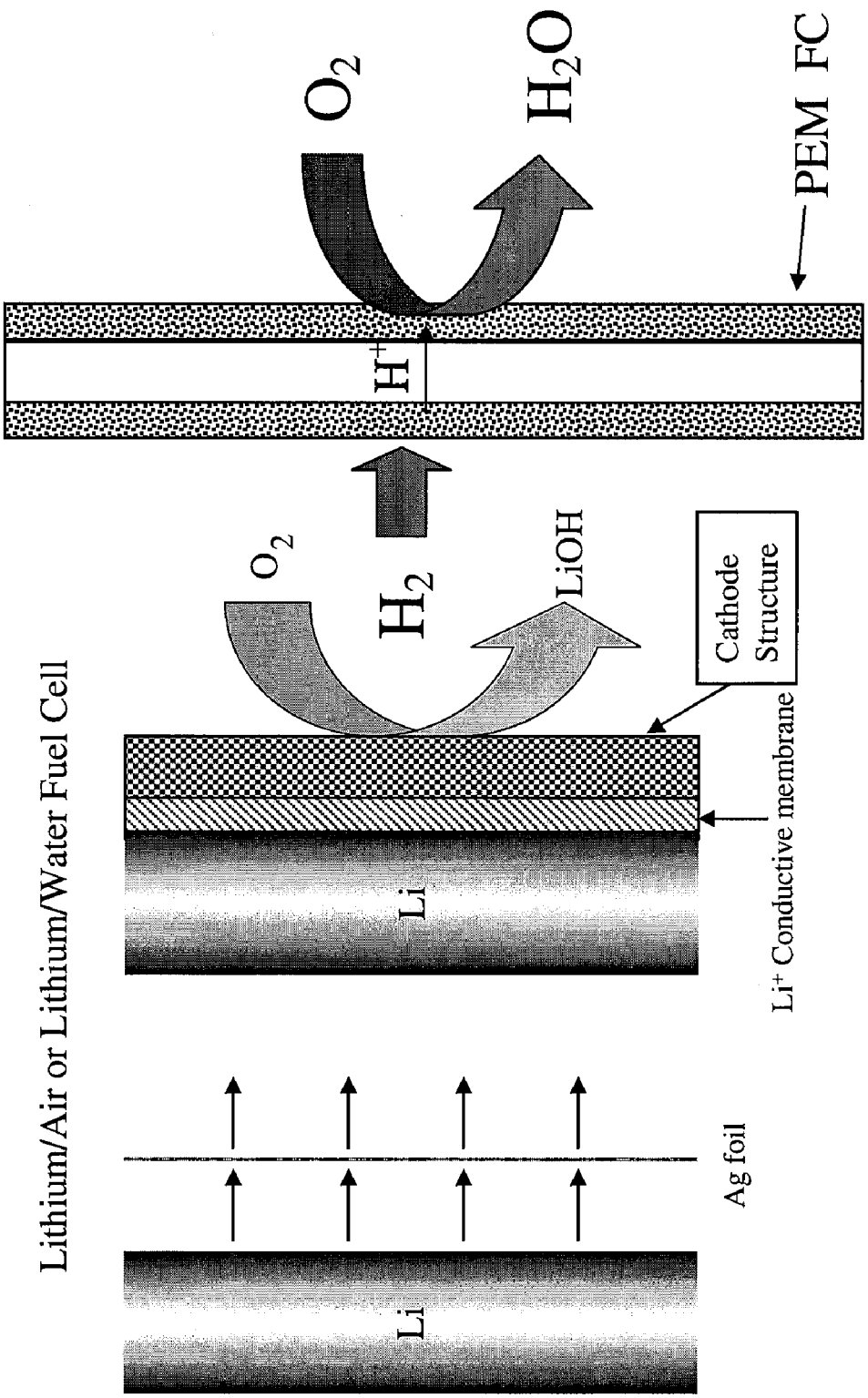
FIG. 4 illustrates a Li/water fuel cell and hydrogen generator for a PEM fuel cell in accordance with one embodiment of the present invention.

In addition, by coupling the Li/water fuel cell as described herein with a PEM $H_2/O_2$ fuel cell, as illustrated in FIG. 4, hydrogen released from the Li/water fuel cell can be captured and the energy density and fuel efficiency of this system may be further further increased.

Conclusion

Although the foregoing invention has been described in some detail for purposes of clarity of understanding, it will be apparent that certain changes and modifications may be practiced within the scope of the invention. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. An alkali metal fuel cell, comprising:
   an anode comprising solid alkali metal as fuel;
   a cathode structure comprising a static electronically conductive component, an ionically conductive component comprising an electrolyte for ions of the alkali metal, and a fluid oxidant obtained from an operating environment of the cell;
   a protective membrane interposed between the anode and the cathode structure, the membrane conductive to ions of the alkali metal, the membrane isolating the anode from the fluid oxidant of the cathode structure; and
   alkali metal dissolved in a solvent on the anode side of the membrane.

2. The cell of claim 1, wherein the fluid oxidant comprises a liquid oxidant.

3. The cell of claim 2, wherein the liquid oxidant comprises an aqueous solution.

4. The cell of claim 1, wherein the electrolyte comprises water.

5. The cell of claim 1, wherein the electrolyte comprises an aqueous solution.

6. The cell of claim 1, wherein the electrolyte is flushed through the cathode structure.

7. The cell of claim 1, wherein the alkali metal is lithium or a lithium alloy.

8. A method of providing electrical power, the method comprising:
   i) discharging an alkali metal fuel cell to provide electrical power, the cell comprising,
   an anode comprising solid alkali metal as fuel,
   a cathode structure comprising a static electronically conductive component, an ionically conductive component comprising an electrolyte for ions of the alkali metal, and a fluid oxidant obtained from an operating environment of the cell,
   a protective membrane interposed between the anode and the cathode structure, the membrane conductive to ions of the alkali metal, the membrane isolating the anode from the fluid oxidant of the cathode structure, and
   alkali metal dissolved in a solvent on the anode side of the membrane; and
   ii) adding fresh solid alkali metal fuel for the anode such that discharge of the cell continues.

9. The method of claim 8, further comprising repeating the discharging and adding until cell operation is no longer desired.

10. The method of claim 8, further comprising supplementarily replacing the electrolyte.

11. The method of claim 10, wherein the supplementarily replacing the electrolyte includes flushing the cathode structure with electrolyte.

12. The method of claim 8, wherein the fluid oxidant further comprises a liquid oxidant, and the method comprising:
   i) discharging the fuel cell;
   ii) supplementarily adding fresh solid alkali metal fuel for the anode;
   iii) supplementarily replacing the liquid oxidant; and
   iv) repeating the discharging, adding and replacing until cell operation is no longer desired.

13. The method of claim 12, wherein the supplementarily replacing the liquid oxidant includes flushing the cathode structure with liquid oxidant.

14. The method of claim 13, wherein the liquid oxidant comprises water.

15. The method of claim 13, wherein the liquid oxidant comprises an aqueous solution.

16. A method of removing waste product from an alkali metal fuel cell, the method comprising:
   i) discharging an alkali metal fuel cell, the cell comprising,
   an anode comprising solid alkali metal as fuel,
   a cathode structure comprising a static electronically conductive component, an ionically conductive component comprising an electrolyte for ions of the alkali metal, and a fluid oxidant obtained from an operating environment of the cell,
   a protective membrane interposed between the anode and the cathode structure, the membrane conductive to ions of the alkali metal, the membrane isolating the anode from the fluid oxidant of the cathode structure, and
   alkali metal dissolved in a solvent on the anode side of the membrane, thereby creating waste products in the cathode structure; and
   ii) flushing the cathode structure to remove the waste products from the cathode structure.

17. The method of claim 16, wherein the flushing comprises flushing electrolyte through the cathode structure.

18. The method of claim 16, wherein the flushing comprises flushing liquid oxidant through the cathode structure.

19. The method of claim 18, wherein the liquid oxidant comprises water.

20. The method of claim 16, further comprising repeating the discharging and flushing until cell operation is no longer desired.

* * * * *